United States Patent
Merheb et al.

(10) Patent No.: US 7,869,816 B2
(45) Date of Patent: Jan. 11, 2011

(54) METHOD OF TRANSMITTING AREA SPECIFIC CONTENT

(75) Inventors: Patrick Merheb, Puteaux (FR); Bruno Legat, Lisses (FR)

(73) Assignee: Alcatel, Paris (FR)

( * ) Notice: Subject to any disclaimer, the term of this patent is extended or adjusted under 35 U.S.C. 154(b) by 173 days.

(21) Appl. No.: 10/986,051

(22) Filed: Nov. 12, 2004

(65) Prior Publication Data

US 2005/0119012 A1    Jun. 2, 2005

(30) Foreign Application Priority Data

Dec. 2, 2003    (EP) ................................. 03027600

(51) Int. Cl.
*H04W 24/00* (2009.01)
(52) U.S. Cl. .................. 455/456.3; 455/466; 455/414.2
(58) Field of Classification Search ............. 455/456.3, 455/456.6, 466, 414.1, 414.2
See application file for complete search history.

(56) References Cited

U.S. PATENT DOCUMENTS

| | | | | |
|---|---|---|---|---|
| 5,684,859 | A * | 11/1997 | Chanroo et al. | 455/433 |
| 6,091,956 | A * | 7/2000 | Hollenberg | 455/456.5 |
| 6,353,398 | B1 * | 3/2002 | Amin et al. | 340/995.12 |
| 6,731,940 | B1 * | 5/2004 | Nagendran | 455/456.1 |
| 6,909,903 | B2 * | 6/2005 | Wang | 455/456.1 |
| 6,957,076 | B2 * | 10/2005 | Hunzinger | 455/456.3 |
| 6,968,179 | B1 * | 11/2005 | De Vries | 455/414.1 |
| 7,010,306 | B1 * | 3/2006 | Tanibayashi et al. | 455/456.1 |
| 7,027,801 | B1 * | 4/2006 | Hall et al. | 455/412.1 |
| 2002/0035605 | A1 * | 3/2002 | McDowell et al. | 709/206 |
| 2002/0062251 | A1 * | 5/2002 | Anandan et al. | 705/14 |
| 2002/0077080 | A1 * | 6/2002 | Greene | 455/412 |
| 2002/0102967 | A1 * | 8/2002 | Chang et al. | 455/414 |
| 2003/0100315 | A1 * | 5/2003 | Rankin | 455/456 |
| 2003/0125049 | A1 | 7/2003 | Buchmann et al. | |
| 2004/0092271 | A1 * | 5/2004 | Viikari et al. | 455/456.2 |
| 2005/0113115 | A1 * | 5/2005 | Haberman et al. | 455/456.3 |

FOREIGN PATENT DOCUMENTS

| EP | 1 119 211 A2 | 7/2001 |
|---|---|---|
| EP | 1 320 270 A1 | 6/2003 |

* cited by examiner

*Primary Examiner*—Temica M Beamer
(74) *Attorney, Agent, or Firm*—Sughrue Mion, PLLC

(57) ABSTRACT

A method of transmitting area specific content to a mobile terminal via a wireless network covering at least two areas, each area having at least one access point is provided. Data indicative of the assignment of the mobile terminal to one of the access points is transmitted to a first network component, one of the areas in which the mobile terminal is located is identified based on a logical mapping of access points to areas, and content specific to one of the areas is pushed to the mobile terminal.

6 Claims, 2 Drawing Sheets

METHOD OF TRANSMITTING AREA SPECIFIC CONTENT

BACKGROUND OF THE INVENTION

The invention is based on a priority application EP03027600.0 which is hereby incorporated by reference.

The present invention relates to the field of telecommunication, and more particularly to location based services.

Location based services focus on the problem of providing value-added services to subscribers based on the location of a wireless device within a wireless network.

According to one type of location based wireless service, subscribers obtain information on businesses located in the vicinity of the wireless device. As subscribers move throughout the wireless network with their wireless device, they may enter requests for location information related to particular types of businesses.

The requests for the location of the wireless device are processed in the Gateway Mobile Location Center or another network platform to determine the location area, cell identity with geographical coordinates or the like, of the requesting wireless device. The device location information is provided to a relational database that identifies businesses located within or near the location of the wireless device and provides the business location information to the wireless device. In some cases, the service provider may use information provided by the subscriber to provide the business location information to the device.

For example, a subscriber could specify certain preferred business, such as a preferred hotel chain. When the location request is received, the subscriber information is used to retrieve and provide information about the preferred hotels matching the subscriber's information.

SUMMARY OF THE INVENTION

The present invention provides a method of transmitting area specific content to a mobile terminal via a wireless network that covers at least two areas. Each area of the network has at least one access point that provides coverage for that area. The term 'access point' as used herein encompasses all network components that provide radio coverage for a given area or cell, such as base stations, Node-B's and the like.

When the mobile terminal is activated the user logs in and a network registration procedure is performed. As a result of the registration procedure the mobile terminal is assigned to one of the access points that provides radio coverage to the location where the mobile terminal is presently located. Data being indicative of the assignment of the mobile terminal to one of the access points is transmitted to a network component, such as a location server. The various areas covered by the wireless network are defined by a logical mapping of access points to areas. The area in which the mobile terminal is presently located is determined on the basis of its assignment to one of the access points and the logical mapping.

Area specific content that is received from a content server is transmitted to the mobile terminal by means of a push service. The push service can be triggered when the mobile terminal enters a given area, exits from a given area or is provided at random or periodic time intervals while the mobile terminal stays within a given area. For example the area specific content is pushed concurrently or sequentially to all mobile terminals that are located within a given area.

The present invention is particularly advantageous in that a single network component, such as a location server, can provide subscriber location information to an instant messaging server which enables the instant messaging server to push area specific content to the active mobile terminals of subscribers in the various areas.

In accordance with a preferred embodiment of the invention the identification of an area in which a mobile terminal is located is performed by the location server. The result of the identification is transmitted to the instant messaging server. Alternatively the location server forwards the data being indicative of the assignment of the mobile terminal to the instant messaging server which performs the identification of the respective area.

In accordance with the preferred embodiment of the invention the location server generates area specific lists of subscribers. The area specific lists are provided from the location server to the instant messaging server as a basis for the push service.

BRIEF DESCRIPTION OF THE DRAWINGS

In the following preferred embodiments of the invention will be described by way of example only with reference to the drawings in which.

DETAILED DESCRIPTION

Figure 1:
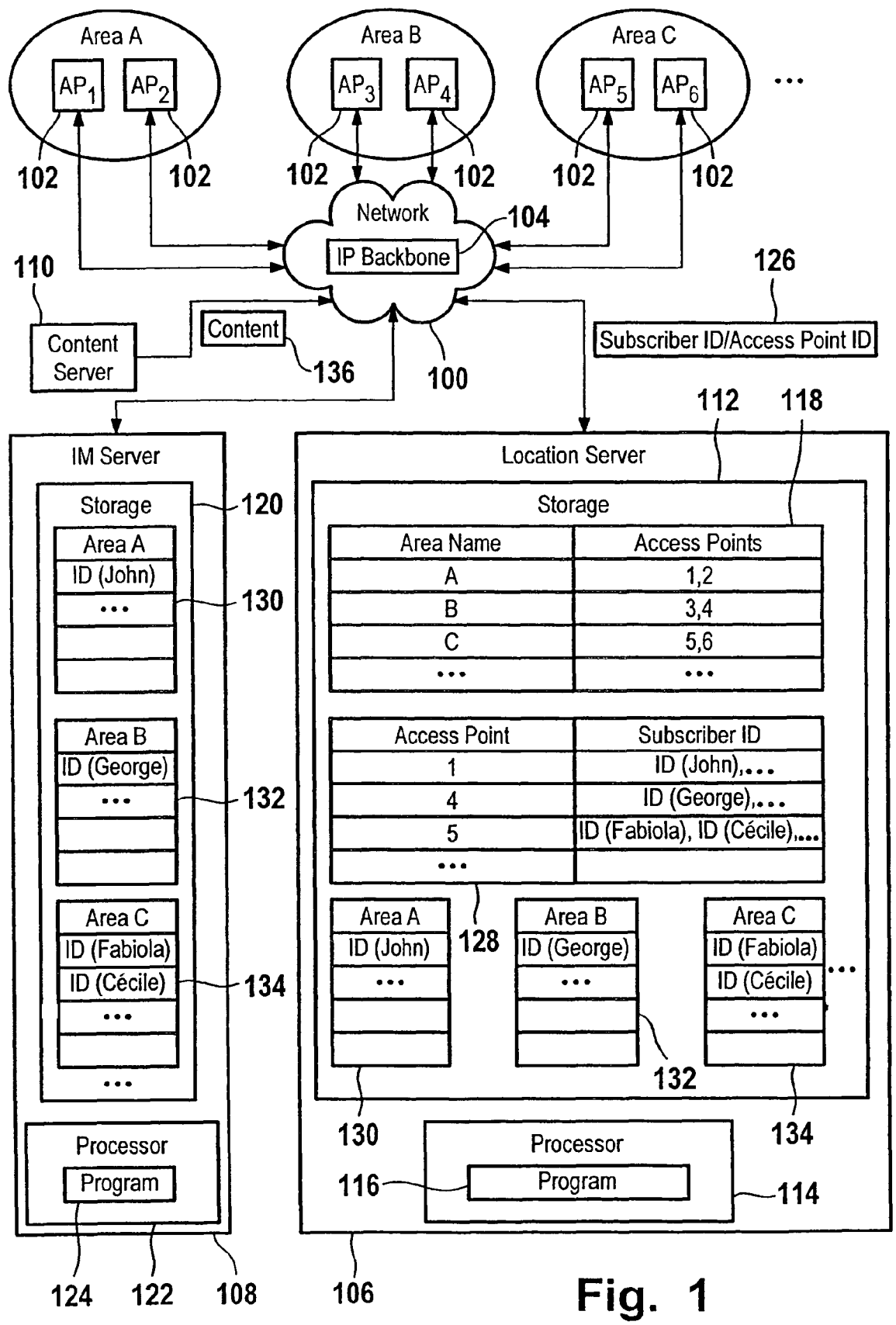
FIG. 1 is a block diagram of a preferred embodiment of a wireless network of the invention.

FIG. 1 shows network 100 that provides wireless coverage to areas A, B, C, . . . Each one of the areas A, B, C, . . . has at least one access point 102 that is coupled to a network 100. For example, access points 102 coupled to network 100 provides a wireless local area network (WLAN) in compliance with the Wi-Fi standard provided by the Wi-Fi alliance.

Network 100 has IP backbone 104 through which location server 106, instant messaging server 108, and content server 110 can communicate.

Location server 106 has storage 112 and processor 114 for running program 116. Program 116 controls operation of location server 106. Mapping table 118 that maps access points 102 to area names A, B, C, . . . is stored in storage 112. For example each one of the access points $AP_i$ 102 has a unique identifier i. The identifiers i of access points that belong to the same area are entered in the row of that area in mapping table 118. For example access points 102 with identifiers 1 and 2 are assigned to area A whereas access points 102 with the identifiers 3 and 4 are assigned to area B, etc.

Instant messaging server 108 can provide instant messaging push services to active mobile terminals within the coverage of one of the access points 102. For example instant messaging server 108 uses the extensible messaging and presence protocol (XMPP) as approved by the IETF Internet engineering steering group (IESG). XMPP is an open, XML-based protocol for near real-time extensible messaging and presence. It is the core protocol of the Jabber instant messaging and presence technology.

In addition or as an alternative instant messaging server 108 may use wireless village or SIMPLE (Session Initiation Protocol Extension for Instant Messaging). SIMPLE is an extension to the session initiation protocol (SIP) that allows to transfer instant messages.

Wireless village is another mobile instant messaging and presence (IMPS) initiative. Wireless village is based on prevalent protocols and other well-adapted standards such as SMS (short messaging services), MMS (multimedia messaging services), WAP (wireless application protocol), SIP and XML.

Instant messaging server 108 has storage 120 and processor 122 for running program 124.

In operation location server 106 receives data 126 from network 100. Data 126 provides the identifier of an access point to which an active subscriber is currently assigned. For example data 126 contains a tuple (subscriber identifier/access point identifier) for each active mobile terminal within the coverage of network 100.

For example subscriber John is located in area A and its mobile terminal is within the coverage of access point $AP_1$. Subscriber George is within area B and his mobile terminal is assigned to access point $AP_4$. Subscribers Fabiola and Cécile are located within area C and their respective mobile terminals are in the coverage of access point $AP_5$. This information is transmitted as data 126 from network 100 to location server 106 and entered into table 128.

Program 116 uses mapping table 118 and table 128 in order to generate area specific lists 130, 132, 134, . . . These lists are also referred to as 'buddy lists'. In other words each one of the area specific lists 130, 132, 134, . . . contains a list of subscriber identifiers in order to identify subscribers having active mobile terminals within a corresponding area.

The area specific lists 130, 132, 134, . . . are transmitted from location server 106 to instant messaging server 108. These lists are stored in storage 120. Instant messaging server 108 receives area specific content 136 from content server 110. For example area specific content 136 is a sequence of text, audio video and/or multimedia files that are assigned to a specific one of the areas A, B, C, . . .

Instant messaging server 108 sends the area specific content 136 provided by content server 110 to the respective subscribers as identified in the area specific lists 130, 132, 134, . . . under the control of program 124.

For example network 100 covers a museum: In area A of the museum $18^{th}$ century paintings are exposed whereas in area B $19^{th}$ century paintings and in area C $20^{th}$ century paintings are exposed. Content server 100 delivers information as to the paintings and artists of $18^{th}$ century paintings exposed in area A. Likewise content server 110 delivers information regarding the $19^{th}$ century paintings exposed in area B and a further set of information regarding the $20^{th}$ century paintings exposed in area C.

Instant messaging server 108 sends the information on the $18^{th}$ century paintings to the subscribers listed in area-specific list 130 of area A as a push service. Likewise instant messaging server pushes the information on the $19^{th}$ century paintings to the subscribers listed in area specific list 132 and the information on the $20^{th}$ century paintings to the subscribers as listed in area specific list 134, etc.

A preferred implementation is based on the Instant Messaging framework. In this case content server 110 takes the role of a special user of the IM Server 108. IM server 108 with assistance of program 116 provides this special user with multiple buddy lists that are access point specific. Further, user preferences can be considered for selection of the content and/or for disabling the content delivery.

It is to be noted that the preferred embodiment considered here is particularly advantageous as a single location server 106 can provide location information regarding the various areas covered by the network. Further the definition of the areas is flexible and can be modified by editing table 128. In the above considered museum example this flexibility is particularly advantageous as it allows to modify the definition of the various areas for the next exhibition for which the boundaries of areas A, B, C . . . may change.

Figure 2:
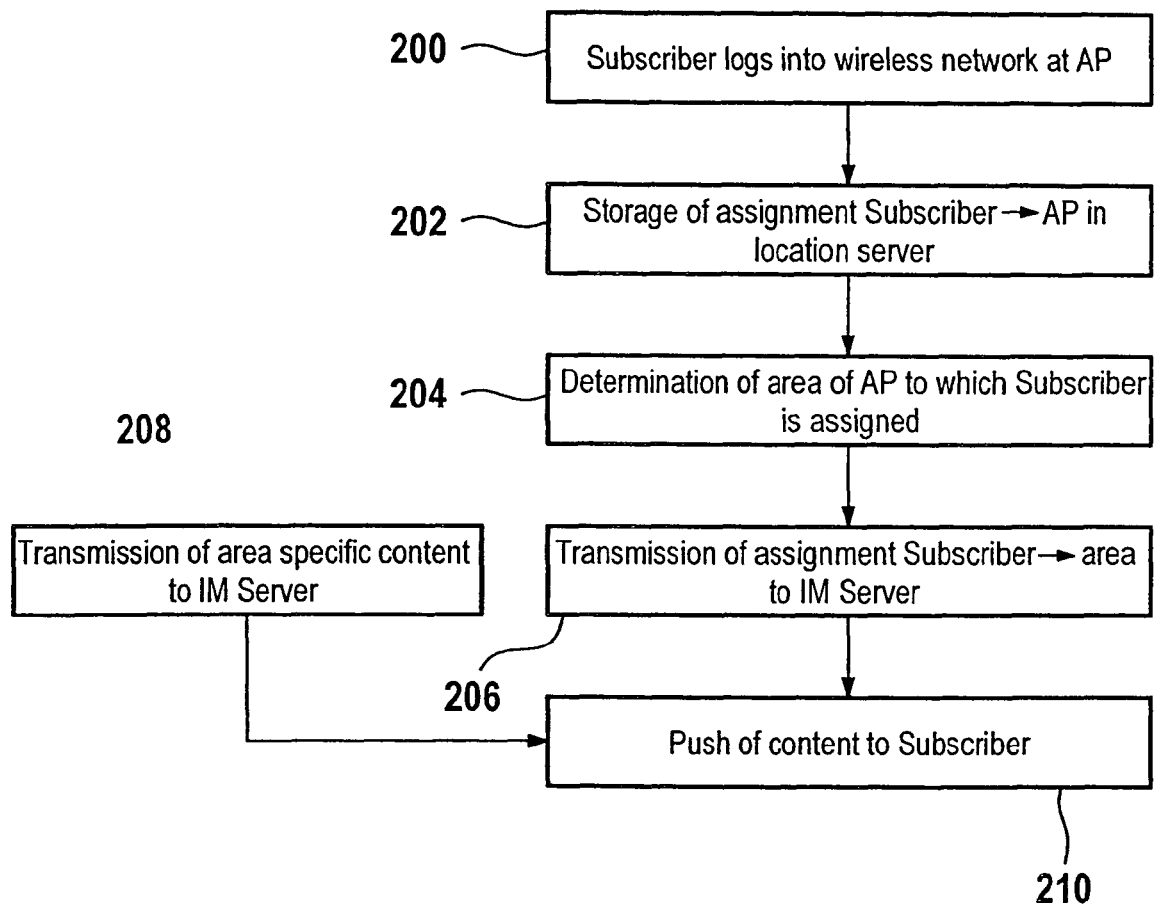
FIG. 2 is a flow diagram illustrating a preferred embodiment of a method of the invention.

FIG. 2 shows a corresponding flow chart.

In step 200 a subscriber logs into a wireless network and is assigned to one of the access points of the wireless network as a result of the registration procedure. For example the user enters his or hers log in ID and password. The subscriber's ID can be constituted by a combination of the log in ID, password, and the IP address of his or her mobile terminal.

In step 202 the assignment of subscriber ID to access point ID is stored in the location server. Next the location server determines the area in which the subscriber is located based on the mapping table (step 204). The information regarding the presence of subscribers with active mobile terminals in the various areas is transmitted from the location server to the instant messaging server in step 206. Further the instant messaging server receives area specific content in step 208. In step 210 the instant messaging server sends push messages to the subscribers with area-specific content.

It is to be noted that the communication between the location server 106 and the instant messaging server 108 can be performed by means of the LIF (location interoperability forum) protocol or the MLP (mobile location protocol).

List of Reference Numerals

100 Network
102 Access point
104 IP backbone
106 Location server
108 Instant messaging server
110 Content server
112 Storage
114 Processor
116 Program
118 Mapping Tables
120 Storage
122 Processor
124 Data
128 Tables
130 Area specific list
132 Area specific list
134 Area specific list
136 Content

The invention claimed is:

1. A method of transmitting area specific content to a mobile terminal via a wireless network covering at least two areas, each area having at least one access point, the method comprising:
   transmitting data being indicative of an assignment of the mobile terminal to one of the access points to a first network component,
   identifying one of the areas in which the mobile terminal is located on the basis of a logical mapping of access points to areas,
   receiving of area specific content,
   pushing of content being specific to the one of the areas to the mobile terminal,
   wherein the pushing of content is triggered when the mobile terminal enters or exits one of the areas;
   generating of area specific lists being indicative of mobile terminals being located in the areas by the first network component,
   transmitting the area specific lists to a second network component, the second network component being an instant messaging server, storing the area specific lists in storage of the instant messaging server, providing the area specific content by a content server that is coupled to the second network component, and pushing of the area specific content to at least some of the mobile terminals identified in the respective area specific list.

2. The method of claim 1, wherein the identification of one of the areas is performed by the first network component and a result of the identification is transmitted from the first network component to a second network component.

3. The method of claim 1, wherein the data being indicative of the assignment of the mobile terminal to the one of the access points is transmitted from the first network component to a second network component, and wherein the second network component performs the identification of the one of the areas in which the mobile terminal is located.

4. The method of claim 1, wherein the area specific content is transmitted from a content server to a second network component.

5. The method of claim 1, further comprising generating of area specific lists being indicative of mobile terminals being located in the areas by the first network component and transmitting the area specific lists to a second network component for pushing of area specific content to the mobile terminals.

6. A location server for coupling to a wireless network comprising:

a storage component for storing of data being indicative of assignments of mobile terminals to access points of the wireless network, and for storing of a logical mapping of the access points to areas covered by the wireless network, data processing means for identification of the areas in which mobile terminals are located on the basis of the data being indicative of the assignments and the logical mapping, and for generating of area specific lists indicative of mobile terminals located in the areas;

transmission means for transmitting of the result of the identification to an instant messaging server, the instant messaging server being configured to provide a push service to mobile terminals being assigned to access points of a wireless network covering at least two areas, the instant messaging server comprising:

storage means for storage of the area specific lists receiving means for receiving area specific content from a content server, and data processing means for pushing of the area specific content to the mobile terminals, wherein the instant messaging server pushes area-specific content to the mobile terminals when the mobile terminals enter or exit one of the areas.

* * * * *